May 11, 1965

J. D. FORNEY 3,183,338

SPOT WELDING GUN

Filed April 3, 1962

INVENTOR.

JACK D. FORNEY

BY Horace B. VanValkenburgh

Gary D. Fields

ATTORNEYS

May 11, 1965 J. D. FORNEY 3,183,338

SPOT WELDING GUN

Filed April 3, 1962

INVENTOR.

JACK D. FORNEY

BY Horace B. Van Valkenburgh

Gary D. Fields

ATTORNEYS

May 11, 1965 J. D. FORNEY 3,183,338

SPOT WELDING GUN

Filed April 3, 1962 4 Sheets-Sheet 3

INVENTOR.
JACK D. FORNEY
BY
Horace B. Van Valkenburgh
Gary D. Fields
ATTORNEYS

INVENTOR.
JACK D. FORNEY
BY
Horace B. Van Valkenburgh
Gary D. Fields
ATTORNEYS

United States Patent Office 3,183,338

Patented May 11, 1965

3,183,338

SPOT WELDING GUN

Jack D. Forney, 1820 Laporte Ave., Fort Collins, Colo.

Filed Apr. 3, 1962, Ser. No. 184,847

11 Claims. (Cl. 219—127)

This invention relates to a welding gun, and more particularly to a spot welding gun.

Various types of spot welding guns have been utilized, but with each of these, it is normally necessary for the operator either to weld on both sides of the work or to provide additional apparatus on the side opposite from that on which the gun is used. This arrangement is both time consuming and costly. Also, some spot welding guns have utilized welding rods but involved complicated mechanism with a resultant unduly high cost thereof. With such apparatus, it is difficult to strike an arc so that a smooth weld is produced.

Among the objects of this invention are to provide a novel spot welding gun; to provide such a spot welding gun which need be applied to one side only of the work, thus avoiding the necessity of equipment or action on the back side thereof; to provide such a spot welding gun which may be used to weld work when the back surface is not accessible; to provide such a spot welding gun which utilizes a carbon rod, such as an electrode formed of a carbon and graphite composition, rather than a welding rod; to provide such a spot welding gun wherein a carbon rod contacts the metal to preheat it and then is retracted to produce an arc to finish the weld; to provide, in one embodiment, a spot welding gun which is trigger operated; to provide such a spot welding gun in which the trigger determines the spacing of the carbon rod from the work; to provide a spot welding gun, in another embodiment, which is pressure operated; to provide such a pressure operated spot welding gun in which the spacing between a carbon rod and the work may be predetermined; to provide such a spot welding gun which is of simple construction but yet durable; and to provide such spot welding guns which easily and quickly produce high quality welds.

Additional objects and the novel features of this invention will become apparent from the description which follows, taken in conjunction with the accompanying drawings, in which.

Figures 1, 2:
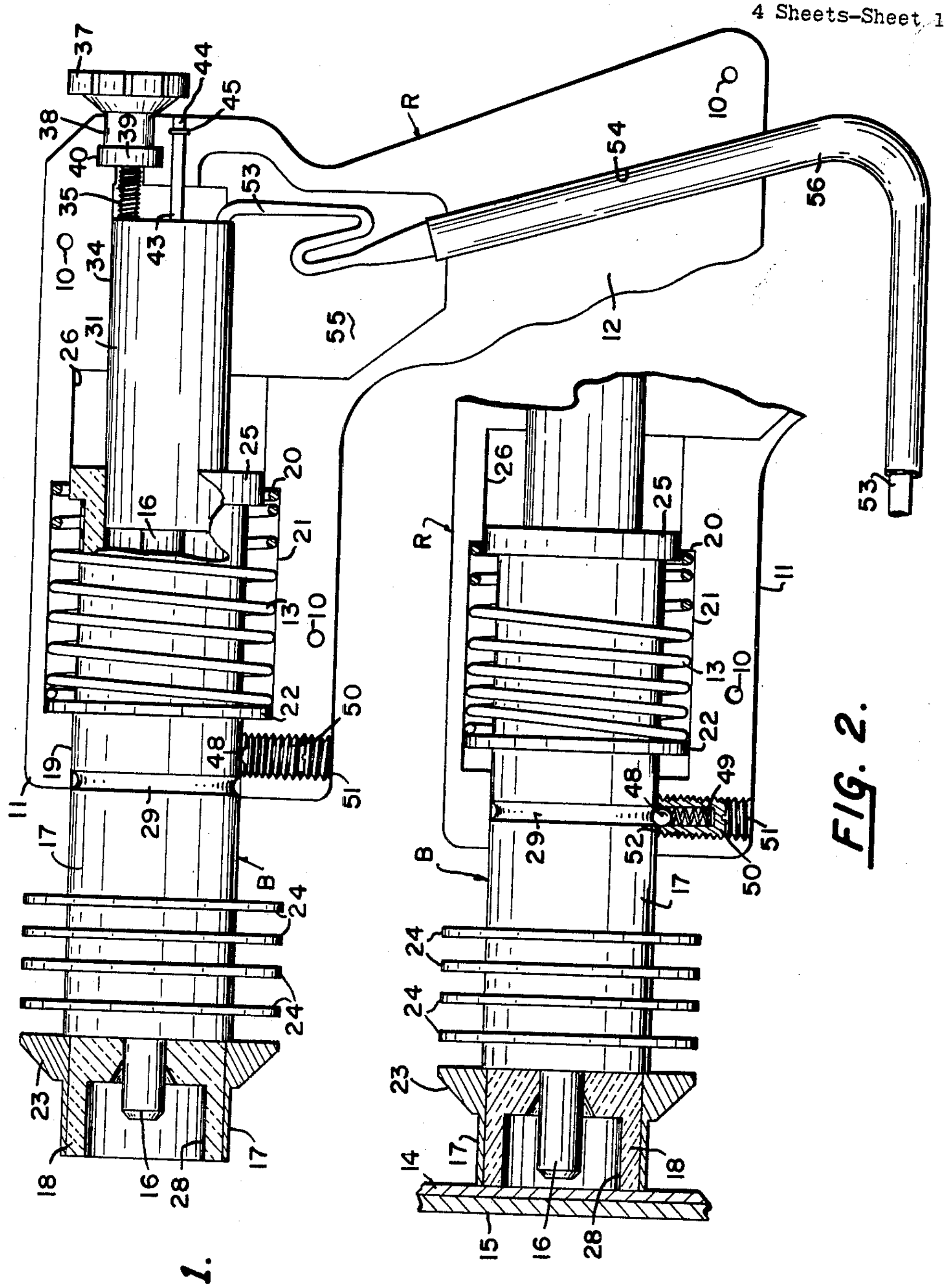
FIG. 1 is a side elevation of a trigger operated spot welding gun of this invention, with a left side plate removed to show the details of the interior mechanism.
FIG. 2 is a partial side elevation, similar to FIG. 1, but showing the work and a carbon rod in arc position.
Figures 3, 4, 5:
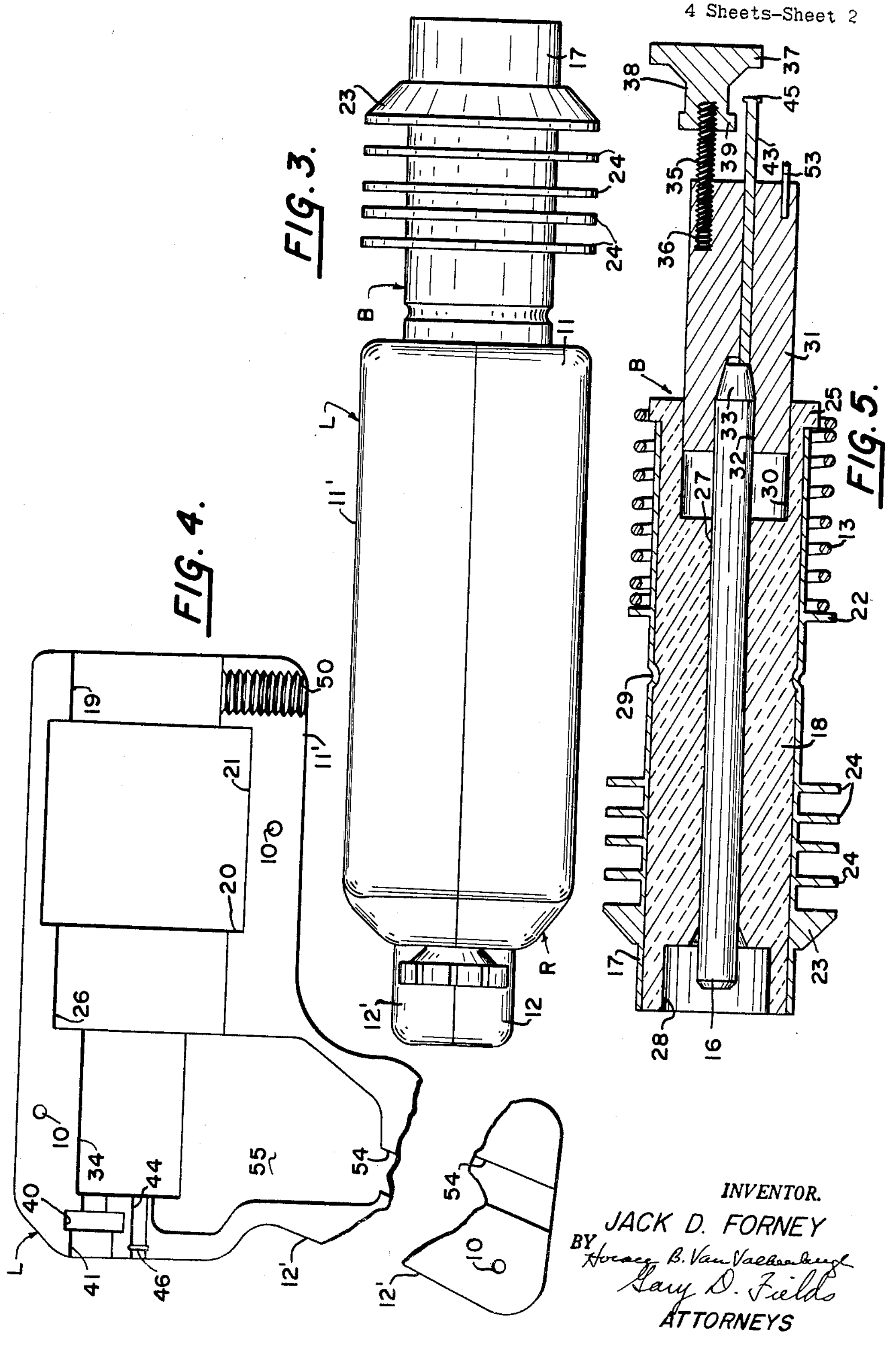
FIG. 3 is a top plan view of the spot welding gun of FIG. 1.
FIG. 4 is a condensed side elevation of the left side plate for the spot welding gun of FIG. 1, showing the interior construction thereof.
FIG. 5 is a longitudinal section of the upper portion or barrel of the welding gun of FIG. 1, with the handle removed, and showing particularly details of a carbon rod adjustment mechanism.

A spot welding gun constructed in accordance with this invention, as shown in FIGS. 1–5, comprises a housing formed by a side plate R of FIGS. 1 and 3 and a complementary left side plate L of FIGS. 3 and 4, which are attached together in any suitable manner, as by locking screws extending through holes 10 therein. Additional screws may be provided if needed to hold the side plates together and the screws may be provided at different points than those illustrated. Right side plate R has a barrel section 11 and a handle or grip portion 12, while left side plate L has a similar but complementary barrel section 11' and handle or gripping portion 12'. The side plates are conveniently made of a hard molded plastic or other insulating material. A barrel B is movable within the housing formed by the side plates R and L, against the pressure of a coil spring 13, so that when the end of barrel B is pushed against the outer of two plates 14 and 15, for instance, of FIG. 2, which are to be spot welded together, a carbon rod 16, which is adjustable longitudinally of the housing but is generally in fixed position in the housing, will first engage the work. Current flows between the end of rod 16 into the work to preheat the same. After preheating, the housing is withdrawn a short distance, so that the end of carbon rod 16 will strike an arc to complete the weld.

Barrel B comprises an outer sleeve 17 formed of metal, such as steel, an aluminum alloy or the like, and an inner sleeve 18 formed of ceramic or other insulating material, to insulate the carbon rod 16. Outer sleeve 17 is slidable longitudinally in a circular hole 19 formed by semicircular recesses in the outer ends of the respective right and left side plates. Barrel B is normally urged forwardly by compression spring 13 which encircles the barrel and at its inner end abuts a shoulder 20 formed at the inner end of a circular recess 21 formed by semiconductor recesses in the side plates R and L. Recess 21 has a larger diameter than hole 19, to accommodate spring 13, the outer end of which abuts a circumferential flange 22 on the barrel B, received in recess 21. The barrel B is provided near its front end with an outwardly extending, circumferential flange 23 which is sufficiently heavy to receive an accidental blow, thereby preventing damage to the work contacting front end of outer sleeve 17, as well as with a plurality of circumferential cooling fins 24. Flange 23 and cooling fins 24 are conveniently formed integrally with outer sleeve 17, as in FIG. 5. The inner insulating sleeve 18 may be slid into the outer sleeve 17 from the rear end, until a rear flange 25 thereof abuts the rear end of the outer sleeve as shown. Rear flange 25 of insulating sleeve 17 is slidable within a bore 26 formed by semicircular recesses in the side plates R and L, while sleeve 18 is provided with a central bore 27 to accommodate carbon rod 16 and a counterbore 28 at its outer end to provide a recess for the arc formed during spot welding. For a purpose described later and also to prevent longitudinal movement of insulating sleeve 18 within sleeve 17, the outer sleeve may be rolled about its perimeter to form a groove 29 extending into a corresponding groove formed in the insulating sleeve, thereby holding it in place.

The rear end of insulating sleeve 18 is also provided with a counterbore 30 for receiving the end of a cylindrical mounting block 31 which supports carbon rod 16 and is provided at its front end with a central hole 32 terminating in a tapered socket which engages the tapered inner end 33 of carbon rod 16, as in FIG. 5, to hold the carbon rod relatively securely during use. Mounting block 31 is arranged to slide longitudinally within a bore 34 formed by semicircular recesses in the right and left side plates.

One end of an adjustment screw 35 is threadably received in a threaded bore 36 in the rear end of block 31 and the other end is conveniently imbedded in an adjustment knob 37, which is formed of insulating material and rotatably supported by a neck 38 between the left and right side plates. Knob 37 is prevented from longitudinal movement by a front flange 39 which engages a socket 40 formed by semicircular recesses adjacent the rear end of the right and left side plates, respectively, and spaced from the rear ends of the side plates by semicircular flanges 41 which engage neck 38. Thus, it can be seen that upon turning adjustment knob 37 in one direction, block 31 and carbon rod 16 will be adjusted forwardly within barrel B, but upon turning knob 37 in the opposite direction, the block and carbon rod will be adjusted rearwardly. The forward end of a conveniently hexagonal rod 43 extends into block 31, through a correspondingly shaped hole, to the socket at the inner end of hole 32, thereby abutting the inner end of carbon rod 16. The rear portion of rod 43 is disposed in a correspondingly shaped hole 44 formed by opposed recesses in side plates R and L, while the rear end of rod 43 conveniently terminates in a peripheral flange 45 which engages a recess 46 formed in the side plates, to prevent longitudinal movement of the end. Rod 43 is used to push carbon rod 16 out of the socket in block 31 when it is desired to remove the same and replace it. This is accomplished by turning knob 37 in a direction so that block 31 is moved rearwardly, causing the end of rod 43 to engage the end of carbon rod 16 and push it forwardly with respect to the block.

A ball and spring detent arrangement, cooperating with groove 29, is conveniently provided to maintain the carbon rod in arc striking position during the spot welding operation. This arrangement includes a ball 48, as in FIG. 1, urged inwardly by a coil spring 49 into engagement with barrel B and adapted to drop into groove 29, as in FIG. 2, when the handle is moved rearwardly after preheating, so as to position the end of carbon rod 16 in a desired arcing position. Of course, when the end of rod 16 is pushed into engagement with the workpiece for preheating, ball 48 will snap past groove 29. Also, when pressure is removed, spring 13 will cause ball 48 to snap out of groove 29. However, when the ball snaps into the groove, the operator is assisted materially in maintaining the carbon rod at a desired position. Of course, as the carbon rod is consumed, it is adjusted by knob 37, but this can take place between successive welds. Ball 48 and spring 49 are disposed in a hollow threaded plug 50, which is threaded into a transverse hole 51, formed by a generally semicircular recess in side plates R and L and also provided with threads to receive plug 50. Plug 50 is conveniently provided with an inturned lip 52 at its inner end, to prevent ball 48 from popping out of the plug. It will be understood that groove 29 need not extend clear around the barrel but may be a mere depression for engaging ball 48. In that event, however, it may be desirable to provide means for holding barrel B in one radial position.

Electric current is supplied to carbon rod 16, as in FIG. 1, through a cable 53 extending upwardly through a hole 54 in the hand grip, formed by recesses in the side plates, as in FIG. 4, then into a space 55, formed by recesses in the side plates below bore 34, for connection to block 31, as in FIG. 5, such as being attached by solder in a hole in the lower rear end of block 31. Current is, of course, transmitted through block 31 to carbon rod 16. It will be noted that the cable has a generally S-shaped configuration within the space 55, as shown in FIG. 1, to provide sufficient slack to permit longitudinal movement of the barrel B, carbon rod 16 and block 31, without restriction. The cable is conveniently protected by a suitable insulator 56 extending within and outwardly from the handle, as shown.

The welding gun is operated in the following manner: First, the barrel of the gun is placed against the outer of two plates to be welded, such as plates 14 and 15 of FIG. 2, which are grounded. Next, pressure is exerted on the gun, forcing the barrel B rearwardly within the housing until the end of carbon rod 16 comes into contact with plate 14. During this movement, groove 29 is forced past spring urged ball 48 from the position shown in FIG. 1 to a position to the right of ball 48. This position is held for a period of one or two seconds, so that the current flowing through the carbon rod and plates causes the plates to be preheated in the area to be welded. Next, the pressure is released slightly, allowing the barrel B to move forwardly with respect to side plates R and L until ball 48 snaps into groove 29, as shown in FIG. 2. The gun is then held in this position for an additional one or two seconds as an arc is struck between the plate 14 and carbon rod 16, melting sufficient metal of the respective plates to complete the weld. Finally, the barrel of the gun is entirely removed from plate 14, the force of spring 13 against the barrel forcing ball 48 out of groove 29 to resume the position shown in FIG. 1. Thus, it can be seen that a spot weld may be formed without the necessity of having any equipment or action at the back side of the plates.

The gun may operate from a conventional welding transformer having a plurality of taps, such as varying from 20 amps to 180 amps. However, the higher the amperage at the transformer tap to which the gun is connected, the lower the open circuit voltage. Since the best amperage range for the spot welding gun of the present invention appears to be between 60 and 100 amps, whereas the most desirable open circuit voltage in this amperage range appears to be from 40 to 50 volts, it is necessary to connect the gun to a higher amperage transformer tap to provide a sufficiently small open circuit voltage and then in some way decrease the amperage to the desired range. This may be accomplished by a reactance coil having a connector at one end thereof, which is adapted to be received in any of the taps of the transformer and a plurality of taps along the coil into which the gun cable 53 may be plugged. In use, the reactance coil is plugged into one of the taps of the transformer, such as in the amperage range of between 130 and 180 amps. The gun is then plugged into one of the taps on the reactance coil which will produce an amperage range of between 60 and 100 amps at approximately 45 volts, open circuit voltage. It is clear that the reactance coil may be plugged into any one of the transformer taps while the gun may be plugged into any of the reactance coil taps to vary the ratio of amperage to open circuit voltage to the value needed to easily and quickly produce the type of weld desired.

Figures 6, 7:
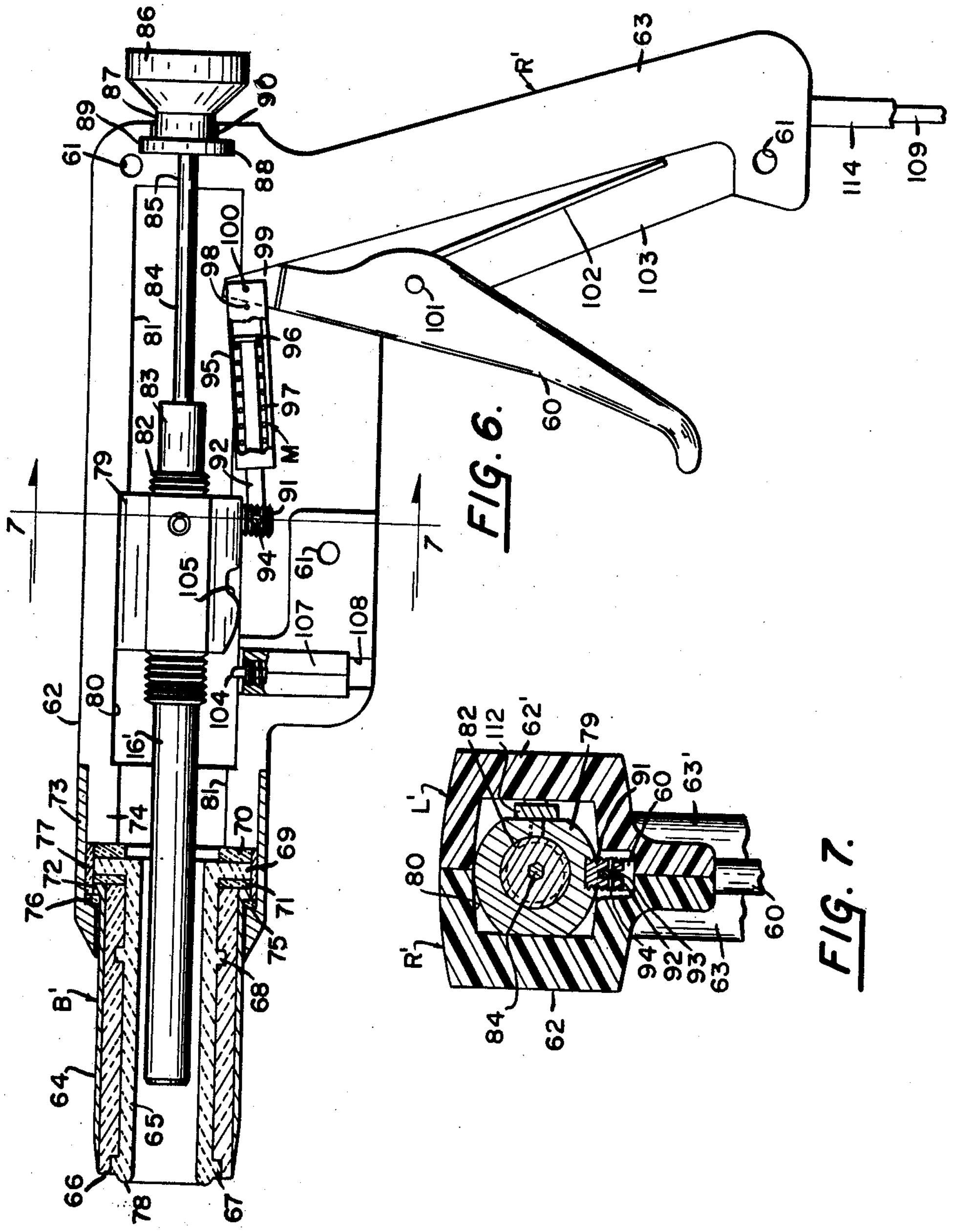
FIG. 6 is a side elevation, similar to FIG. 1, of an alternative spot welding gun with a left side plate removed to show details of the interior mechanism.
FIG. 7 is a vertical section taken along line 7—7 of FIG. 6, showing details of a carbon rod adjustment mechanism and trigger assembly.
Figures 8, 9, 10:
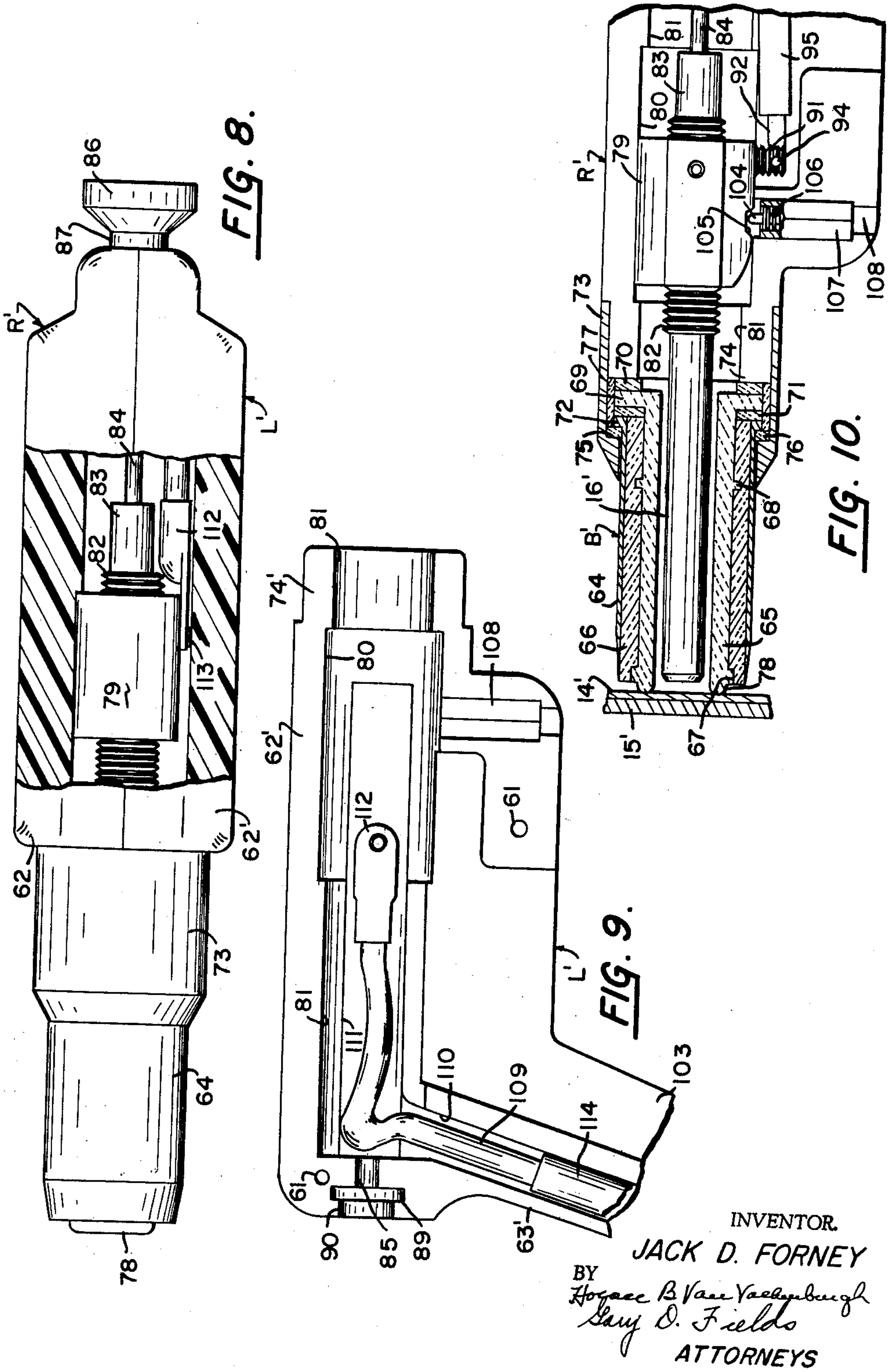
FIG. 8 is a top plan view of the welding gun of FIG. 6, with parts broken away to show details of a slide mechanism.
FIG. 9 is a fragmentary side elevation of the cover plate which is removed in FIG. 6, showing the interior construction thereof and an electrical connection.
FIG. 10 is a fragmentary, longitudinal section of the barrel or upper portion of the gun of FIG. 6 and showing the carbon rod in arc striking position.

An alternative spot welding gun, as shown in FIGS. 6–10, is operated by a trigger 60 and comprises a housing formed by a right side plate R′, as shown in FIGS. 6 and 10, and a complementary left side plate L′, as shown in FIG. 9. These side plates may be attached together in any suitable manner, as by locking screws extending through holes 61 therein. Additional screws may be provided if needed to hold the side plates together and the screws may be provided at different points than those illustrated. Right side plate R′ has a barrel section 62 and a handle or grip portion 63, while left side plate L′ has a similar but complementary barrel section 62′ and handle or gripping portion 63′. As in the previous embodiment, the side plates are conveniently made of a hard, molded plastic or other insulating material. In this embodiment, a barrel B′ is fixably mounted within the housing formed by side plates R′ and L′, the end of which may be placed against the outer of two plates 14′ and 15′, for instance, of FIG. 10, which are to be spot welded together by a carbon rod 16′ which is movable longitudinally of housing B′ by trigger 60 so that the carbon rod 16′ may be first brought into engagement with the work. Current flows between the end of rod 16′ into the work to preheat the same. After preheating, the carbon rod is withdrawn a short distance by partially releasing trigger 60, so that the end of carbon rod 16′ will strike an arc to complete the weld.

Barrel B′ comprises an outer sleeve 64 formed of metal, such as steel, an aluminum alloy or the like, and an inner sleeve or liner 65 formed of a ceramic or other insulating material to insulate the carbon rod 16′ and is spaced from outer sleeve 64, as by a fire-clay cylinder 66 therebetween. Advantageously, the fire-clay cylinder 66 may be formed on liner 65 and fired thereto, being held in place by a front peripheral flange 67 and a peripheral flange 68 spaced rearwardly of flange 67. The inner end of liner 65 terminates in a peripheral flange 69 which may be spaced from the end of barrel sections 62 and 62′ by an asbestos washer 70, while cylinder 66 may be spaced from flange 69 by means of another asbestos washer 71, which also spaces flange 69 from an inner peripheral flange 72 of sleeve 64. Barrel B′ is held in place by a metal sleeve 73 which engages reduced portions 74 and 74′ of barrel sections 62 and 62′, respectively, and has an inwardly extending flange 75 at the outer end thereof for holding in place an asbestos washer 76 which prevents contact between sleeve 64 and sleeve 73 and further holds an asbestos ring 77 in position, as shown, to prevent contact between flanges 69 and 72 and sleeve 73. Advantageously, ceramic liner 65 is provided with a lip 78 which spaces the end of barrel B′, particularly cylinder 66 and sleeve 64, from the work piece 14′, which is grounded, as in FIG. 10.

A generally cylindrical, movable mounting block or slide 79, which supports carbon rod 16′, is arranged to slide longitudinally within a bore 80 formed by semicircular recesses in the right and left side plates. Conveniently, a smaller bore 81 extends both forwardly and rearwardly from bore 80, for receiving another mechanism to be described, and is similarly formed by semicircular recesses in right side plate R′ and left side plate L′. Advantageously, an adjustment screw 82 is threadably received in and extends longitudinally through slide 79, as shown in FIG. 6, and is provided with a recess at the forward end for receiving and holding carbon rod 16′. A neck 83 at the other end of screw 82 provides additional length for slidably receiving a control rod 84 which rod and the corresponding hole in screw 82 are non-circular, as in FIG. 7. The opposite end of rod 84 extends through a hole 85 formed by recesses in the respective right and left side plates and is connected at its outer end to a knob 86, which is formed of insulating material and is rotatably supported by a neck 87, between the left and right side plates. Knob 86 is prevented from longitudinal movement by a front flange 88 which engages a socket 89 formed by semicircular recesses adjacent the rear end of the right and left side plates, respectively, and spaced from the rear end of the side plates by semicircular flanges 90 which engage neck 87. Thus, it can be seen that upon turning adjustment knob 86 in one direction, screw 82 and carbon rod 16′ will be adjusted forwardly in slide 79, but that upon turning knob 86 in the opposite direction, the screw and carbon rod will be adjusted rearwardly. Thus, not only can knob 86 and rod 84 be used to adjust the position of the carbon rod 16′, but also to eject the carbon rod by turning screw 82 so that it moves rearwardly on rod 84 sufficiently that the end of rod 84 will push rod 16′ out of screw 82. Also, neck 83 accommodates rod 84 when slide 79 is moved to the position of FIG. 10.

Slide 79 is moved longitudinally by means of trigger 60 through a link mechanism M, conveniently connected to a set screw 91 which is threadably received in the bottom of slide 79. Thus, a rod 92 extends into a slot 93, shown in FIG. 7, in set screw 91 and is pivoted therein on a pin 94, as shown in FIGS. 6 and 7, the other end of rod 92 extending into a cylinder 95 and having a peripheral flange 96. Rod 92 is normally urged inwardly in cylinder 95 by a coil spring 97 surrounding rod 92 and extending between flange 96 and the forward end of cylinder 95. The inward movement of rod 92 is limited by a pin 98, which extends transversely through cylinder 95, as shown, and which will be engaged by flange 96 upon maximum inward movement of rod 92. Conveniently, cylinder 95 is provided with a slot at the inner end thereof, for receiving a connector 99 pivoted thereto by pivot pin 100. The lower end of connector 99 is attached to trigger 60 which is pivoted to right side plate R′ and left side plate L′ by a pivot pin 101 surrounded by a leaf spring having one end extending (not shown) within trigger 60 and another extending end 102 which engages the edge of a recess 103 in the right and left side plates, respectively, and normally urges the lower end of handle 60 to a forward position. Advantageously, connector 99 is formed of a resilient material, such as rubber or plastic, so as to reduce the shock when it strikes the edge of recess 103 upon rearward movement thereof.

When the trigger 60 is squeezed, slide 79 and carbon rod 16′ move forwardly until carbon rod 16 touches the work, thereby preheating the same, which takes one or two seconds. Then, the operator releases the pressure slightly on trigger 60, allowing slide 79 and carbon rod 16′ to retract slightly, to the position shown in FIG. 10, to strike an arc between plate 14′ and the carbon rod. Advantageously, slide 79 is held in this position by a pin 104 which engages a notch 105 in slide 79. Pin 104 is connected to a set screw 106 threadably received in a hexagonal nut 107 which is mounted in a hexagonal recess 108 formed in side plates R′ and L′ and conveniently provided with an Allen head recess in the lower end thereof for adjustment purposes. Thus, when pin 104 engages notch 105, slide 79 and carbon rod 16′ will be held in the position of FIG. 10, so that a slight relaxation of the pressure on trigger 60 will not cause slide 79 to move rearwardly past pin 104 because the additional force of the spring in handle 63 is stored by spring 97 in cylinder 95. However, upon completion of the weld, the operator completely releases trigger 60 so that the force of the spring 102 in handle 63 overcomes the force of spring 97, urging slide 79 and carbon rod 16′ to the fully retracted position shown in FIG. 6.

Electric current is supplied to carbon rod 16′, as in FIG. 6, through a cable 109 extending upwardly through a hole 110 in the hand grip, formed by recesses in the side plates, as in FIG. 9, then into a space 111, formed in left side plate L′, for connection to a lead 112 adapted to be connected to slide 79 by means of a screw 113, as in FIG. 8. Current is, of course, transmitted through slide 79 to carbon rod 16′. It will be noted that the cable has sufficient slack within space 111 to permit longitudinal movement of slide 79 and carbon rod 16′ without restriction. The cable is conveniently protected by a suitable insulator 114 extending within and outwardly from the handle, as shown.

The welding gun of FIGS. 6–10 is operated in the following manner: First, the barrel of the gun is placed against the outer surface of two plates to be welded, such as plates 14′ and 15′ of FIG. 10, which are grounded. Next, trigger 60 is squeezed, forcing slide 79 and carbon rod 16′ forwardly until the end of carbon rod 16′ comes in contact with plate 14′. During this movement, notch 105 is forced past pin 104, from the position shown in FIG. 6 to a position to the left of pin 104 in FIG. 6. This position is held for a period of one or two seconds, so that the current flowing through the carbon rod and plates causes the plates to be preheated at the area to be welded. Next, the pressure is released slightly on trigger 60, allowing slide 79 and carbon rod 16′ to move rearwardly, until pin 104 engages notch 105, as shown in FIG. 10. The gun is then held in this position for an additional one or two seconds, as an arc is struck between plate 14′ and carbon rod 16′, melting sufficient metal of the respective plates to complete the weld. Finally, the trigger is completely released, overcoming the force of spring 97 in link mechanism M and completely retracting slide 79 and carbon rod 16′. Thus, it can be seen that with the welding gun of FIGS. 6–10, a spot weld can be formed without the necessity of having any equipment or action at the back side of the plates.

What is claimed is:

1. A spot welding gun including a housing; a barrel operatively associated with said housing; a slide in said housing; a rod formed of carbon and the like; screw means extending into at least a portion of said slide, one of said slide and said screw means having a recess at the forward end thereof for receiving said carbon rod; a knob operatively connected to said screw means for adjusting said rod longitudinally of said barrel; and means for supplying electric current to said slide.

2. A spot welding gun including a housing; a barrel operatively associated with said housing; a rod formed of carbon and the like; a slide movable within said housing for holding said carbon rod; means for supplying electric current to said slide; a trigger pivoted to said housing; a link including a hollow cylinder having one end pivoted to said trigger; a rod extending into said cylinder and operatively connected to said slide; and resilient means within said cylinder urging said rod inwardly of said cylinder, so that said slide and said carbon rod may be advanced and retracted by movement of said trigger.

3. A spot welding gun including a housing; a barrel operatively associated with said housing; a rod formed of carbon and the like; a slide movable within said housing for holding said carbon rod and having a notch therein; means for supplying electric current to said slide; a trigger pivoted to said housing; a link having one end pivotally connected to said trigger and the other end thereof operatively connected to said slide, so that said slide and said carbon rod may be advanced and retracted by movement of said trigger; a pin resiliently mounted in said housing and adapted to engage said notch to hold said barrel and carbon rod in arc striking position after said trigger has been squeezed and partially released but becomes disengaged from said notch upon complete release of said trigger so that said slide is fully retracted by said spring means.

4. A spot welding gun including a housing; a barrel attached to said housing and having an outer metallic sleeve, an inner insulating sleeve and an intermediate insulating cylinder; a connecting sleeve received over said outer sleeve for attaching said barrel to said housing; a rod formed of carbon and the like; means in said housing for holding said carbon rod within said barrel; and means for supplying electric current to said holding means.

5. A spot welding gun including a housing; a barrel operatively associated with said housing and provided with a depression; a rod formed of carbon and the like; means in said housing for holding said carbon rod within said barrel; means for supplying electric current to said holding means; resilient means interengaging said barrel and said housing for normally urging said barrel outwardly of said housing; a spring urged ball mounted in said housing and spaced rearwardly of said depression when said barrel is in a forward position, so that when placing said barrel against the work to be welded and exerting a force thereon, said barrel will be forced rearwardly against said resilient means so that said depression moves rearwardly past said spring urged ball until the end of said carbon rod contacts said work and upon partial release of the pressure on said barrel, said barrel will move forwardly under the influence of said resilient means until said depression engages said spring urged ball, thereby striking an arc between said rod and said work.

6. A spot welding gun including a housing; a barrel operatively associated with said housing; a rod formed of carbon and the like; a slide within said housing having a recess at the forward end thereof for receiving said carbon rod; screw means having one end extending into said slide; a knob connected to the other end of said screw means for adjusting said slide longitudinally of said barrel; and means for supplying electric current to said slide.

7. A spot welding gun, as set forth in claim 1, wherein said screw means extends axially through said slide and receives said carbon rod; resilient means normally urging said slide rearwardly in said housing; a non-circular rod having one end slidably received in a similarly shaped hole in said screw means and the other end thereof extending into said knob; and means in said housing engaging said knob to prevent longitudinal movement thereof but permitting rotational movement thereof, so that said screw means may be moved forwardly and rearwardly by turning said knob, thereby providing longitudinal adjustment of said carbon rod.

8. A spot welding gun, as set forth in claim 1, in which said non-circular rod is polygonal in cross section and said knob includes a peripheral flange received in a vertical recess in said housing for rotational movement therein.

9. A spot welding gun, as set forth in claim 4, wherein both said inner and outer sleeves are provided with peripheral flanges at their inner ends; a first washer between the peripheral flange of said inner sleeve and the end of said housing; a second washer between said flanges; a third washer between said flange of said outer sleeve and said connecting sleeve; and a ring between said peripheral flanges and said connecting sleeve.

10. A spot welding gun, as set forth in claim 1, including a non-circular rod having one end extending into a similarly shaped hole in the rear of said slide and the other end provided with a peripheral flange engaging a slot in said housing to prevent longitudinal movement thereof, said rod being adapted to extend forwardly into said recess for said carbon rod so that upon moving said slide rearwardly within said housing by turning said knob, said non-circular rod will push said carbon rod from said recess so that said carbon rod may be replaced.

11. A spot welding gun, as set forth in claim 5, including a circumferential groove around said barrel; a plug threadably received in said housing; a longitudinal bore within said plug; a ball in said longitudinal bore; and a spring in said longitudinal bore having one end bearing against the bottom of said bore and the other end bearing against said ball, urging said ball upwardly against said barrel and into said groove.

References Cited by the Examiner

UNITED STATES PATENTS

| | | | |
|---|---|---|---|
| 2,498,241 | 2/50 | Bowen | 219—130 |
| 2,550,495 | 4/51 | Pilia | 219—127 |
| 2,586,140 | 2/56 | Anderson | 219—130 |
| 2,817,003 | 12/57 | Dusek | 219—130 |
| 2,992,320 | 7/61 | Hill | 219—75 |

RICHARD M. WOOD, *Primary Examiner.*